United States Patent
Sagong

(10) Patent No.: US 11,863,121 B2
(45) Date of Patent: Jan. 2, 2024

(54) COMPLEX ENERGY GENERATION DEVICE USING SUNLIGHT AND SOLAR HEAT

(71) Applicant: KUKDONG ENERGY Corp, Gyeongsangbuk-do (KR)

(72) Inventor: Myeong Geon Sagong, Gyeongsangbuk-do (KR)

(73) Assignee: KUKDONG ENERGY Corp, Gyeongsangbuk-do (KR)

( * ) Notice: Subject to any disclaimer, the term of this patent is extended or adjusted under 35 U.S.C. 154(b) by 0 days.

(21) Appl. No.: 17/395,472

(22) Filed: Aug. 6, 2021

(65) Prior Publication Data

US 2022/0216828 A1 Jul. 7, 2022

(30) Foreign Application Priority Data

Jan. 7, 2021 (KR) .......................... 10-2021-0001872

(51) Int. Cl.
| | |
|---|---|
| H02S 40/44 | (2014.01) |
| H02S 40/42 | (2014.01) |
| F24S 80/30 | (2018.01) |
| F24S 10/50 | (2018.01) |
| F24S 20/00 | (2018.01) |
| F24D 11/00 | (2022.01) |

(52) U.S. Cl.
CPC .............. *H02S 40/44* (2014.12); *F24S 10/50* (2018.05); *F24S 80/30* (2018.05); *H02S 40/425* (2014.12); *F24D 11/003* (2013.01); *F24S 2020/17* (2018.05)

(58) Field of Classification Search
CPC ....... H01L 31/00–078; Y02E 10/50–60; H02S 10/30; H02S 20/00–32; H02S 40/00–44

USPC .................................................. 136/243–265
See application file for complete search history.

(56) References Cited

U.S. PATENT DOCUMENTS

| | | | |
|---|---|---|---|
| 4,292,958 A * | 10/1981 | Lee ......................... | F24S 80/30 126/906 |
| 8,104,466 B2 * | 1/2012 | Kerber .................... | F24S 10/75 165/181 |
| 2005/0258261 A1 * | 11/2005 | Gast .................... | F28D 20/0039 237/2 A |

FOREIGN PATENT DOCUMENTS

| | | | |
|---|---|---|---|
| CN | 201846267 | * | 5/2011 |
| CN | 203405015 | * | 1/2014 |
| CN | 107084540 | * | 8/2017 |
| KR | 10-2009-0094684 A | | 9/2009 |

(Continued)

OTHER PUBLICATIONS

CN201846267 English translation (Year: 2011).*
CN203405015 English translation (Year: 2014).*
CN107084540 English translation (Year: 2017).*

*Primary Examiner* — Bach T Dinh
(74) *Attorney, Agent, or Firm* — Revolution IP, PLLC

(57) ABSTRACT

A complex energy generation device using sunlight and solar heat includes: a heat storage tube having, at a first side portion thereof, an inlet portion into which heat medium oil flows, and having, at a second side portion thereof, an outlet portion from which the heat medium oil is discharged, the heat storage tube having a slit at a lower surface thereof along a longitudinal direction thereof; a solar panel having a plurality of solar cells on a front surface thereof; and a heat radiation panel having an upper portion inserted into the heat storage tube through the slit of the heat storage tube while sealing the slit, and a lower portion laminated on a rear surface of the solar panel.

4 Claims, 7 Drawing Sheets

(56) References Cited

FOREIGN PATENT DOCUMENTS

KR  10-2088670 B1  5/2020
KR  10-2020-0096012 A  8/2020

* cited by examiner

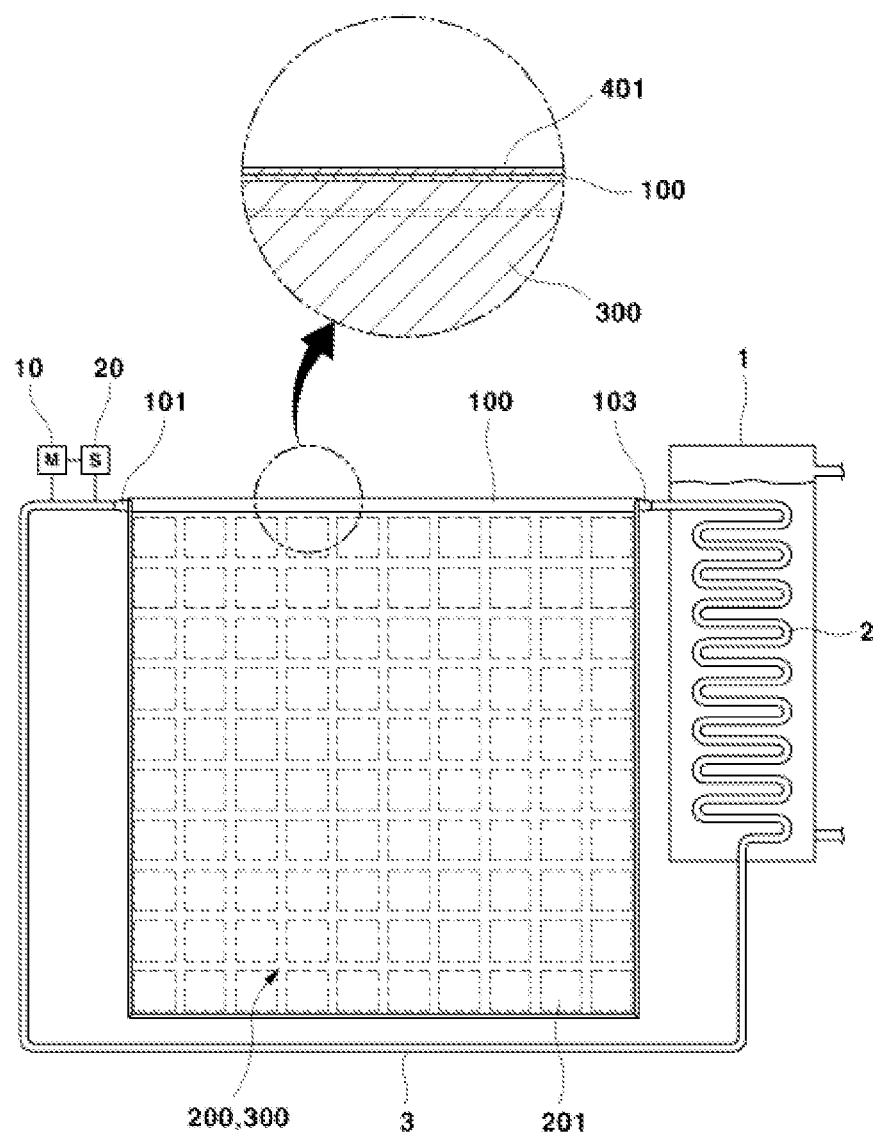
[FIG. 1]

[FIG. 2]
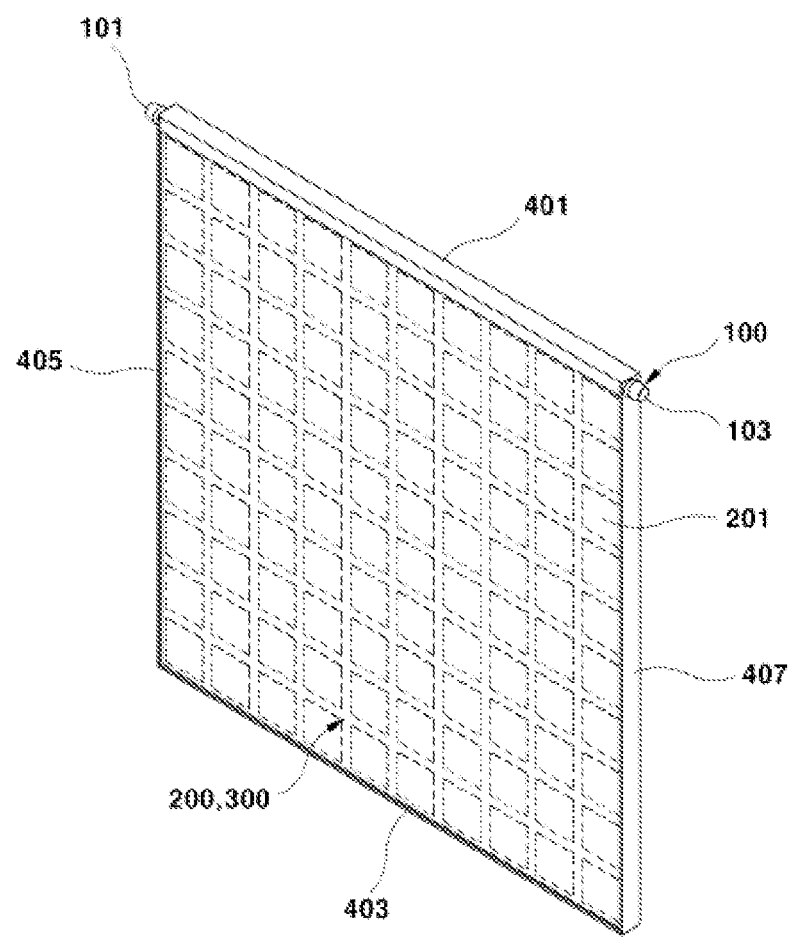

[FIG. 3]
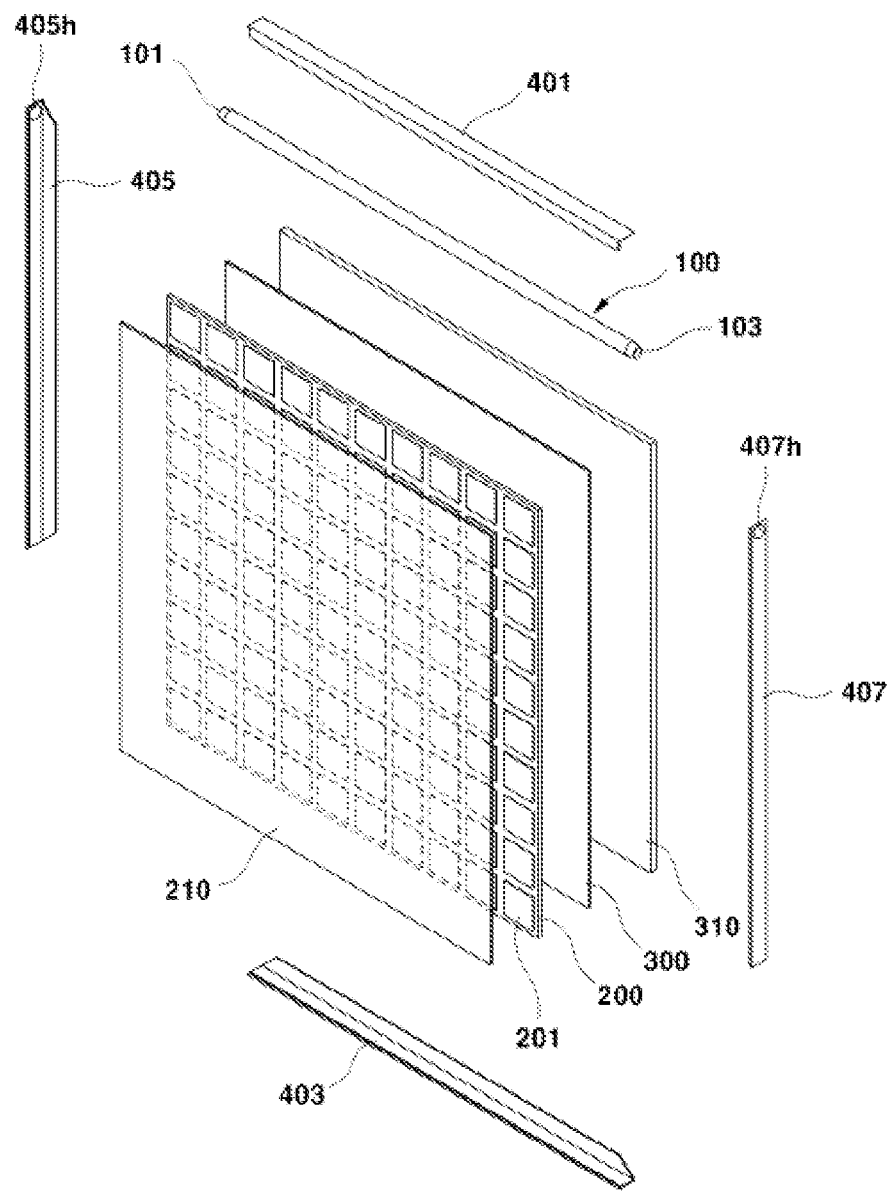

[FIG. 4]
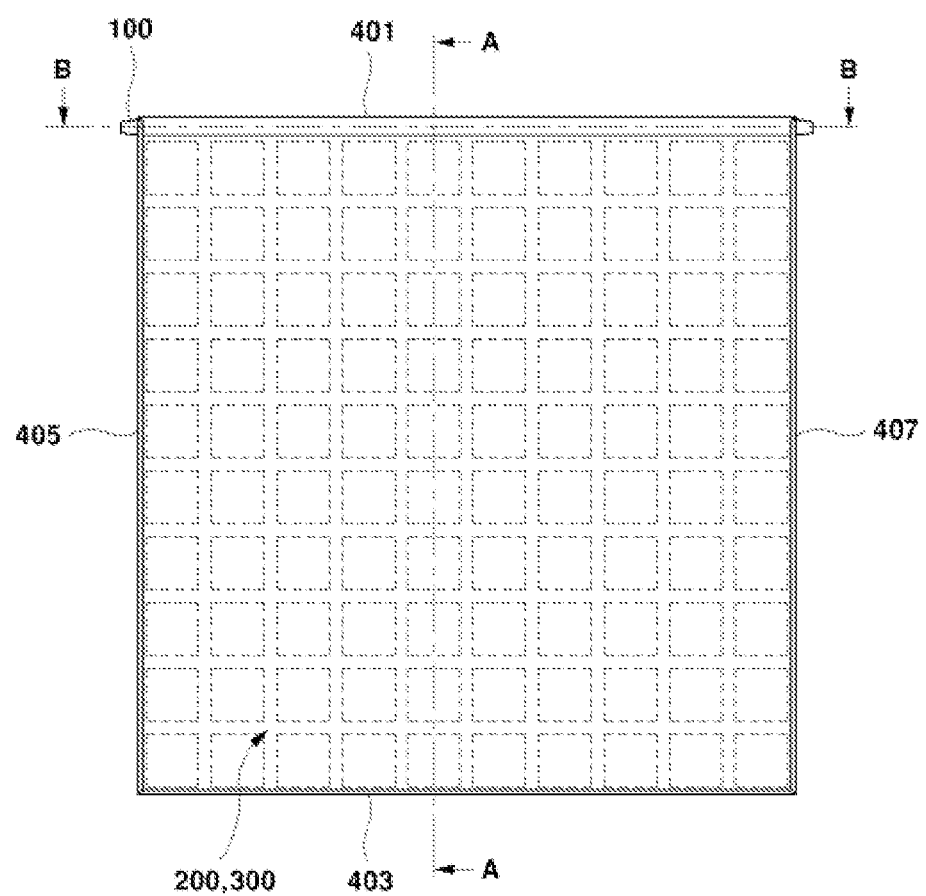

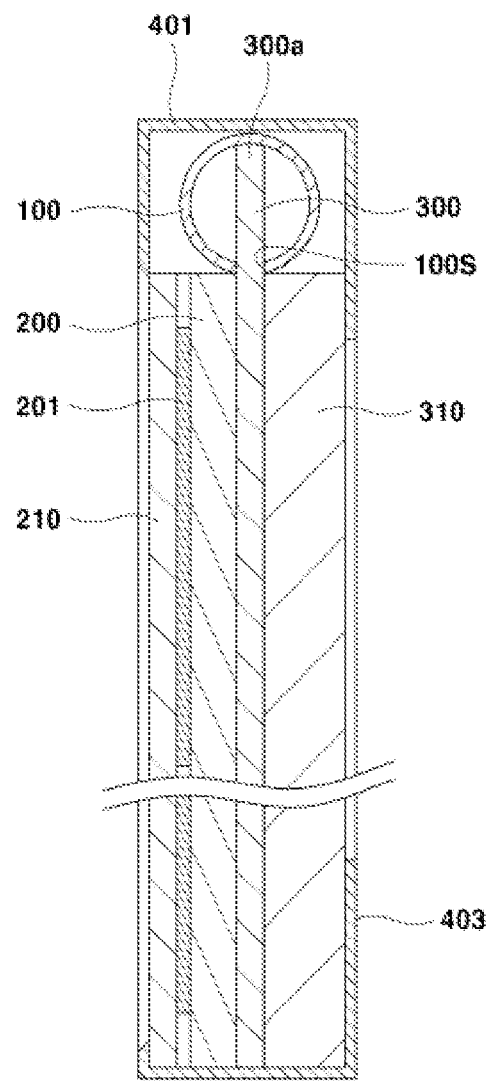
[FIG. 5]

[FIG. 6]
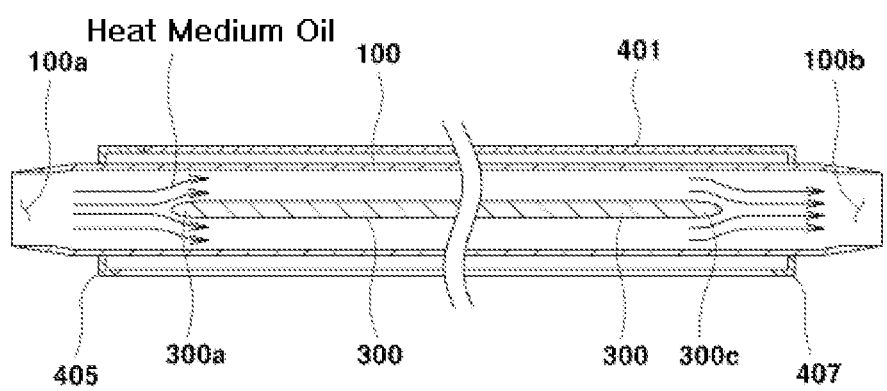

[FIG. 7]
(a)
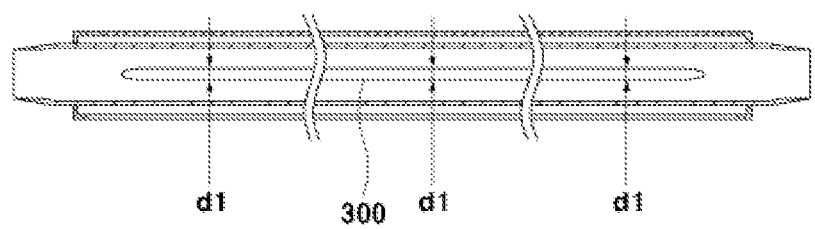
(b)
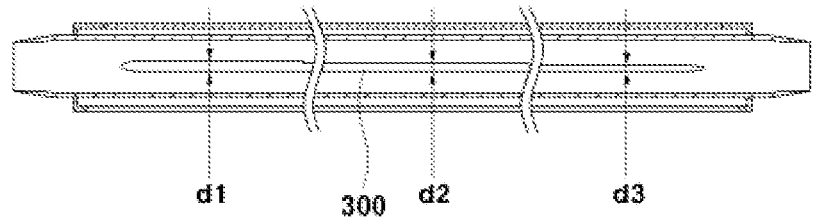
(c)
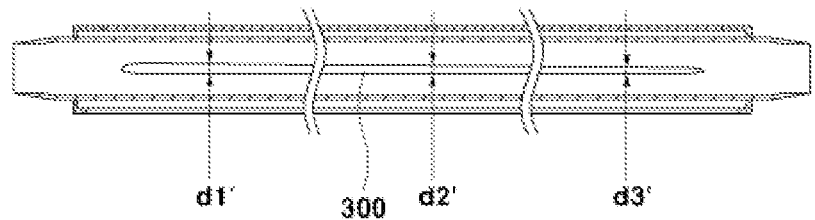

COMPLEX ENERGY GENERATION DEVICE USING SUNLIGHT AND SOLAR HEAT

CROSS REFERENCE TO RELATED APPLICATION

The present application claims priority to Korean Patent Application No. 10-2021-0001872, filed Jan. 7, 2021, the entire contents of which is incorporated herein for all purposes by this reference.

BACKGROUND OF THE INVENTION

Field of the Invention

The present disclosure relates to a complex energy generation device using sunlight and solar heat and, more particularly, to a complex energy generation device using sunlight and solar heat capable of both power generation using sunlight and water heating using solar heat.

Description of the Related Art

Technology for utilization of solar energy is divided into a power generation type using sunlight and a water heating type using solar heat.

Power generation using sunlight has been commercialized after being developed to advanced stages in developed countries including Korea, and research thereof is currently being conducted for efficiency enhancement or generation of high quality power.

Solar collecting is used to absorb solar radiation to generate hot water so that the hot water is supplied for heating of a building and producing domestic hot water. The solar heat system collects solar heat during the day, stores the heat in the form of hot water in a heat storage tank, and supplies the hot water stored in the heat storage tank when necessary.

Meanwhile, a complex energy generation device that may perform both power generation using sunlight and water heating using solar heat is being developed. As an example, 'Solar heat and sunlight hybrid apparatus' disclosed in Korean Patent Application Publication No. 10-2020-0096012 has been proposed.

However, the solar heat and sunlight hybrid apparatus has a complicated structure and low assemblability, so manufacturing the apparatus is difficult, and the apparatus has a structure in which it is difficult to replace each solar heat collector and photovoltaic collector separately from each other, so maintenance thereof is difficult.

DOCUMENTS OF RELATED ART (Patent Document 1) Korean Patent Application Publication No. 10-2020-0096012 (2020-08-11)

SUMMARY OF THE INVENTION

Accordingly, the present disclosure has been made keeping in mind the above problems occurring in the related art, and the present disclosure is intended to provide a complex energy generation device using sunlight and solar heat to perform both power generation using sunlight and water heating using solar heat.

In order to solve the above technical challenge, according to one aspect of the present disclosure, there is provided a complex energy generation device using sunlight and solar heat, the complex energy generation device including: a heat storage tube having, at a first side portion thereof, an inlet portion into which heat medium oil flows, and having, at a second side portion thereof, an outlet portion from which the heat medium oil is discharged, the heat storage tube having a slit at a lower surface thereof along a longitudinal direction thereof; a solar panel having a plurality of solar cells on a front surface thereof; and a heat radiation panel having an upper portion inserted into the heat storage tube through the slit of the heat storage tube while sealing the slit, and a lower portion laminated on a rear surface of the solar panel.

An upper end surface of the heat radiation panel inserted in the heat storage tube may be formed in a curved shape so as to be in close contact with an inner surface of the heat storage tube, and first and second ends of the heat radiation panel inserted in the heat storage tube may be configured to have streamlined cross-sections.

A thickness of a first portion of the heat radiation panel corresponding to the first side portion of the heat storage tube may be formed thicker than a thickness of a second portion of the heat radiation panel corresponding to the second side portion of the heat storage tube.

The thickness of the heat radiation panel may be configured to be gradually thinner or be formed in a multi-stepped shape to be thinner stepwisely as the heat radiation panel goes from the first side to the second side.

An insulation material may be provided on an exposed surface of the heat radiation panel.

As described above, with the complex energy generation device of the present disclosure, both power generation using sunlight and water heating using solar heat can be performed.

The heat radiation panel inserted into the heat storage tube has a form that does not interfere with a flow of the heat medium oil, so that the heat medium oil can efficiently flow.

The heat radiation panel is configured to have a difference in the thickness between the first side portion and the second side portion thereof, so that the efficiency of heat-exchange can be optimized.

Effects of the present disclosure are not limited to the above-mentioned effects, and those skilled in the art will clearly understand other effects not mentioned in consideration of a following description.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a structure view showing an entire system including a complex energy generation device using sunlight and solar heat according to an embodiment of the present disclosure.

FIG. 2 is a perspective view showing the complex energy generation device using sunlight and solar heat according to the embodiment of present disclosure.

FIG. 3 is an exploded-perspective view showing the complex energy generation device using sunlight and solar heat according to the embodiment of present disclosure.

FIG. 4 is a front view showing the complex energy generation device using sunlight and solar heat according to the embodiment of present disclosure.

FIG. 5 is a sectional view taken along A-A in FIG. 4.

FIG. 6 is a sectional view taken along B-B in FIG. 4.

FIG. 7 shows views (A) to (C) illustrating a variation in the thickness of a heat radiation panel of the complex energy generation device according to the embodiment of present disclosure.

DETAILED DESCRIPTION OF THE INVENTION

The present disclosure may be embodied in many different forms without departing from the spirit and significant characteristics of the present disclosure. Therefore, the embodiment of the present disclosure is disclosed only for illustrative purposes and should not be construed as limiting the present disclosure.

It will be understood that, although the terms first, second, etc. may be used herein to describe various elements, these elements should not be limited by these terms.

These terms are only used to distinguish one element, from another element. For instance, a first element discussed below could be termed a second element without departing from the teachings of the present disclosure. Similarly, the second element could also be termed the first element The term "and/or" includes any and all combinations of one or more of the associated listed items.

It will be understood that when an element is referred to as being "coupled" or "connected" to another element, it can be directly coupled or connected to the other element or intervening elements may be present therebetween.

In contrast, it should be understood that when an element is referred to as being "directly coupled" or "directly connected" to another element, there are no intervening elements present.

The terminology used herein is for the purpose of describing a particular embodiment only and is not intended to be limiting. As used herein, the singular forms "a", "an", and "the" are intended to include the plural forms as well, unless the context clearly indicates otherwise.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, preferred embodiments of the present disclosure will be described in detail with reference to the accompanying drawings, the same reference numerals will be used throughout the drawings and the description to refer to the same or like elements or parts, and a detailed description of those elements will be omitted.

In the following description, when the functions of conventional elements and the detailed description of elements related with the present disclosure may make the gist of the present disclosure unclear, a detailed description of those elements will be omitted.

An entire system including a complex energy generation device using sunlight and solar heat (hereinbelow, the device will refer to 'complex energy generation device') according to an embodiment of the present disclosure includes a heat storage tank 1, a heating tube 2, a transfer tube 3, and a complex energy generation device 100, 200, 300, as shown in FIG. 1.

The heat storage tank 1 is a water reservoir having a predetermined inside space, and an upper portion thereof is connected to a supply port to be supplied with domestic water and a lower portion thereof is connected to a discharge port to discharge hot water.

The heating tube 2 is provided to heat the domestic water in the heat storage tank 1 to generate hot water. The heating tube 2 may be arranged in a zigzag array in the heat storage tank 1.

The transfer tube 3 is a tube connecting a first side portion of the complex energy generation device to the heating tube 2. The transfer tube 3 allows heat medium oil that has passed through the complex energy generation device and the heating tube 2 to flow into the complex energy generation device again, so that the heat medium oil is circulated.

Meanwhile, the complex energy generation device is a device configured to perform both power generation using sunlight and water heating using solar heat. Hereinbelow, the complex energy generation device will be described in detail with reference to accompanying drawings.

As shown in FIG. 1, the complex energy generation device includes a heat storage tube 100, a solar panel 200, and a heat radiation panel 300.

The heat storage tube 100 has an inlet portion 101 at a first side portion thereof to receive the heat medium oil and an outlet portion 103 at a second side portion thereof to discharge the heat medium oil.

As shown in FIG. 1, the first side portion of the heat storage tube 100 is connected to the transfer tube 3 and the second side portion of the heat storage tube 100 is connected to the heating tube 2. The heat medium oil flowing into the heat storage tube 100 through the transfer tube 3 performs heat-exchange and then is discharged into the heating tube 2.

A lower surface of the heat storage tube 100 has a slit 100S formed in a longitudinal direction thereof. An upper portion of the heat radiation panel 300 is inserted into the slit 100S.

In the structure of the heat storage tube 100 as described above, the heat medium oil may perform heat-exchange while circulated into the heat storage tube 100 and being brought into contact with the heat radiation panel 300.

The solar panel 200 has a plurality of solar cells 201 performing power generation using sunlight. Specifically, the solar cells 201 are provided on a front surface of the solar panel 200, as shown in FIG. 3. A transparent protective glass 210 may be laminated on the front surface of the solar panel 200.

The solar cells 201 provided on the solar panel 200 are an element generating energy using sunlight, and are configured to supply generated electric energy to the outside through a separate electric wiring (not shown) or to store the generated electric energy in a battery.

The heat radiation panel 300 has the upper portion that is inserted into the heat storage tube 100 through the slit 100S of the heat storage tube 100 while sealing the slit 100S and a lower portion that is laminated on a rear surface of the solar panel 200.

When the solar panel 200 receives sunlight, the temperature of the solar panel 200 gradually is increased. When the temperature of the solar panel 200 is increased above a predetermined temperature, efficiency of energy generation may be reduced.

The heat radiation panel 300 serves to prevent the temperature of the solar panel 200 from being increased above the predetermined temperature.

The form of the slit 100S and the sectional form of the heat radiation panel 300 are formed identically. Accordingly, the slit 100S may be sealed when the upper portion of the heat radiation panel 300 is inserted into the slit 100S. In order to increase a sealing force between surfaces of the slit 100S and the heat radiation panel 300, an O-ring or a separate sealing means may be provided.

As shown in FIG. 5, an upper end surface 300a of the heat radiation panel 300 inserted into the heat storage tube 100 through the slit 100S is extended to reach an inner surface of the heat storage tube 100. The upper end surface 300a of the heat radiation panel 300 is formed in a curved surface so as to be in close contact with the inner surface of the heat storage tube 100.

As shown in FIG. 6, it is preferable that a first end portion 300b and a second end portion 300c of the heat radiation panel 300 inserted into the heat storage tube 100 through the slit 100S have streamlined cross-sections, so that the heat medium oil may be efficiently circulated.

The heat radiation panel 300 is laminated to be in close contact with the rear surface of the solar panel 200 and serves to transmit heat of the solar panel 200 to the heat medium oil.

When the heat-exchange is performed between the solar panel 200 and the heat medium oil circulated in the heat storage tube 100, the temperature of the solar panel 200 is prevented from being increased above the predetermined temperature, so that the efficiency of energy generation may be maintained.

Thermal grease may be disposed between the heat radiation panel 300 and the solar panel 200, and the thermal grease may increase the efficiency of heat transfer between the heat radiation panel 300 and the solar panel 200.

The heat radiation panel 300 described above may be formed of a material with the same coefficient of thermal expansion as the heat storage tube 100 in order to prevent a gap formed between the slit 100S and the heat radiation panel 300 due to a difference in the coefficient of thermal expansion.

According to the structure of the heat radiation panel 300 as described above, the heat radiation panel 300 may be configured to prevent the temperature of the solar panel 200 from being increased above the predetermined temperature and to transmit solar heat to the heat medium oil.

As shown in FIG. 5, an exposed surface of the heat radiation panel 300 to the outside of the heat storage tube 100 may be covered by an insulation material 310.

As shown in FIGS. 7A to 7C, the thickness of the heat radiation panel 300 may vary.

For example, as shown in FIG. 7A, the heat radiation panel 300 may have a uniform thickness.

Furthermore, for example, as shown in FIG. 7B, a thickness of a first side portion of the heat radiation panel 300 corresponding to the first side portion of the heat storage tube 100 is formed thicker than a thickness of a second side portion of the heat radiation panel 300 corresponding to the second side portion of the heat storage tube 100. In other words, the thickness of the heat radiation panel 300 is formed in a multi-stepped shape, so that the thickness of the heat radiation panel 300 is thinner stepwisely as the heat radiation panel 300 goes from the first side portion to the second side portion thereof.

The slit 100S is formed in a shape corresponding to the thicknesses of the heat radiation panel 300. A contact surface of the heat radiation panel 300 in contact with the rear surface of the solar panel 200 is formed flat and an opposite surface to the contact surface is formed in the multi-stepped shape, so variation of the thickness of the heat radiation panel 300 is realized.

For example, as shown in FIG. 7C, a thickness of the first side portion of the heat radiation panel 300 corresponding to the first side portion of the heat storage tube 100 may be formed thicker than a thickness of the second side portion of the heat radiation panel 300 corresponding to the second side portion of the heat storage tube 100. In other words, the thickness of the heat radiation panel 300 may be formed gradually thinner as the heat radiation panel 300 goes from the first side portion to the second side portion thereof.

In FIG. 7C, the slit 100S is formed in a shape corresponding to the thickness of the heat radiation panel 300. The contact surface of the heat radiation panel 300 in contact with the rear surface of the solar panel 200 is formed flat, and the opposite surface to the contact surface is formed to be inclined, so the thickness of the heat radiation panel 300 is changed.

As described above, when the thickness of the first side portion of the heat radiation panel 300 corresponding to the first side portion of the heat storage tube 100 is formed thicker than the thickness of the second side portion of the heat radiation panel 300 corresponding to the second side portion of the heat storage tube 100, the heat-exchange efficiency between the heat radiation panel 300 and the heat medium oil may be increased.

The thickness shape of the heat radiation panel 300 is intended to increase a contact area with the heat medium oil flowing in the heat storage tube 100. In addition, the temperature of the heat medium oil flowing into the inlet portion 101 of the heat storage tube 100 is increased while the heat medium oil passes through the heat storage tube 100, so the heat radiation panel 300 is formed to be thicker to increase an amount of heat-exchange, in order to promote heat-exchange in the inlet portion 101 of the heat storage tube 100.

The complex energy generation device according to the described above embodiment of the present disclosure may perform both power generation using sunlight and heating water using solar heat. As the thickness variation of the heat radiation panel 300 increases a contact area between the heat radiation panel 300 and the heat medium oil, and increases the amount of heat-exchange at the inlet portion side 100a of the heat storage tube 100, the efficiency of heat-exchange is increased.

Although a preferred embodiment of the present disclosure has been described for illustrative purposes with respect to the accompanying drawings, those skilled in the art will appreciate that various modifications, additions and substitutions are possible, without departing from the scope and spirit of the present disclosure as disclosed in the accompanying claims. Therefore, the scope and spirit of the present disclosure should be interpreted by the accompanying claims disclosed with the various modifications.

What is claimed is:
1. A complex energy generation device using sunlight and solar heat, the complex energy generation device comprising:

a heat storage tube having, at a first side portion thereof, an inlet portion into which heat medium oil flows, and having, at a second side portion thereof, an outlet portion from which the heat medium oil is discharged, the heat storage tube having a slit at a lower surface thereof along a longitudinal direction thereof;

a solar panel having a plurality of solar cells on a front surface thereof; and a single heat radiation panel having an upper portion inserted into the heat storage tube through the slit of the heat storage tube while sealing the slit, and a lower portion laminated on a rear surface of the solar panel, wherein only the single heat radiation panel is included in the heat storage tube, wherein an upper end surface of the heat radiation panel inserted in the heat storage tube is formed in a curved shape so as to contact with a portion within an inner surface of the heat storage tube, and first and second ends of the heat radiation panel inserted in the heat storage tube are configured to have streamlined cross-sections, wherein an angle forming the curved shape of the upper end surface of the heat radiation panel corresponds to an angle forming the portion within the inner surface of the heat storage tube, wherein the curved shape of the upper end surface of the single heat radiation panel is evenly flat in a horizontal direction from one end to the other end of the single heat radiation panel so that an entirety of curved shape of the upper end surface of the single heat radiation panel is in direct contact with the inner surface of the heat storage tube.

2. The complex energy generation device of claim 1, wherein a thickness of a first portion of the heat radiation panel corresponding to the first side portion of the heat storage tube is formed thicker than a thickness of a second portion of the heat radiation panel corresponding to the second side portion of the heat storage tube.

3. The complex energy generation device of claim 2, wherein the thickness of the heat radiation panel is configured to be gradually thinner or is formed in a multi-stepped shape to be thinner stepwisely as the heat radiation panel goes from the first side to the second side.

4. The complex energy generation device of claim 1, wherein an insulation material is provided on an exposed surface of the heat radiation panel.

* * * * *